United States Patent
Nishio

(10) Patent No.: US 10,526,948 B2
(45) Date of Patent: Jan. 7, 2020

(54) EXHAUST MANIFOLD AND METHOD OF MANUFACTURING THE EXHAUST MANIFOLD

(71) Applicant: TOYOTA JIDOSHA KABUSHIKI KAISHA, Toyota-shi, Aichi-ken (JP)

(72) Inventor: Yukihiro Nishio, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/009,337

(22) Filed: Jun. 15, 2018

(65) Prior Publication Data
US 2019/0101040 A1 Apr. 4, 2019

(30) Foreign Application Priority Data
Oct. 3, 2017 (JP) .................................. 2017-193232

(51) Int. Cl.
| F01N 13/10 | (2010.01) |
| F01N 13/18 | (2010.01) |
| B23K 101/00 | (2006.01) |

(52) U.S. Cl.
CPC ......... *F01N 13/10* (2013.01); *F01N 13/1805* (2013.01); *F01N 13/1838* (2013.01); *F01N 13/1888* (2013.01); *B23K 2101/006* (2018.08); *F01N 2450/22* (2013.01)

(58) Field of Classification Search
CPC .. F01N 13/10; F01N 13/1805; F01N 13/1838; F01N 13/1888; F01N 2450/22
See application file for complete search history.

(56) References Cited

U.S. PATENT DOCUMENTS

2018/0135499 A1* 5/2018 Kim ..................... F01N 13/10

FOREIGN PATENT DOCUMENTS

| JP | H08-028261 A | 1/1996 |
| JP | H09-141448 A | 6/1997 |
| JP | H10-266846 A | 10/1998 |
| JP | 2005-307856 A | 11/2005 |
| JP | 2007132193 A * | 5/2007 |
| JP | 2016-049561 A | 4/2016 |

OTHER PUBLICATIONS

English Machine Translation of JP 2007-132193 to Muraki, Kohei (Year: 2007).*

* cited by examiner

*Primary Examiner* — Audrey K Bradley
*Assistant Examiner* — Anthony Ayala Delgado
(74) *Attorney, Agent, or Firm* — Oliff PLC

(57) ABSTRACT

An exhaust manifold includes a body portion and a flange portion. The body portion includes a first split body having a plurality of semi-cylindrical portions, and a second split body having a plurality of semi-cylindrical portions. The semi-cylindrical portions of the first and second split bodies overlie each other, respectively, and define branch pipes. The exhaust manifold includes a first weld bead and a plurality of second weld beads. The first weld bead welds the semi-cylindrical portions defining one of the branch pipes to each other from an outer surface side. The second weld beads weld an outer peripheral portion of the one of the branch pipes to an edge portion of opening in the flange portion. At least one of the second weld beads partially overlaps the first weld bead. End portions of neighboring second weld beads overlap each other and are separated from the first weld bead.

2 Claims, 5 Drawing Sheets

EXHAUST MANIFOLD AND METHOD OF MANUFACTURING THE EXHAUST MANIFOLD

INCORPORATION BY REFERENCE

The disclosure of Japanese Patent Application No. 2017-193232 filed on Oct. 3, 2017 including the specification, drawings and abstract is incorporated herein by reference in its entirety.

BACKGROUND

1. Technical Field

The disclosure relates to an exhaust manifold and a method of manufacturing the exhaust manifold.

2. Description of Related Art

An exhaust manifold used for an internal combustion engine includes a body portion having a plurality of branch pipes, and a flange portion having a plurality of openings. Base end portions of the branch pipes are joined together and distal end portions of the branch pipes branch from each other. The distal end portions of the branch pipes are inserted into the openings, respectively. The distal end portions of the branch pipes and peripheries of the openings of the flange portion are coupled to each other, respectively, by welding (for example, Japanese Unexamined Patent Application Publication No. 2016-049561 (JP 2016-049561 A)).

SUMMARY

The body portion can be made of two split bodies that overlie each other. Specifically, in each of the two split bodies, a plurality of semi-cylindrical portions is formed. The split bodies are welded to each other so that the semi-cylindrical portions overlie each other and thus define the branch pipes, respectively.

In an outer surface of each of the branch pipes, a first weld bead for welding the semi-cylindrical portions to each other is formed. Between an outer peripheral portion of each of the branch pipes and an edge portion of each of the openings of the flange portion, a plurality of second weld beads are formed for welding the outer peripheral portion of the branch pipe and the edge portion of the opening. The second weld beads are formed in line in a circumferential direction of the periphery of the opening. After the semi-cylindrical portions are welded to each other, the branch pipes are welded to the peripheries of the openings of the flange portion, respectively. Therefore, at least one of the second weld beads partially overlaps the first weld bead.

End portions of the neighboring second weld beads are formed so as to overlap each other. Therefore, the outer peripheral portion of each of the branch pipes and the edge portion of each of the openings are welded to each other so that no clearance is made between them. The end portions of the second weld beads overlap each other as described above, and, when the end portions of the second weld beads also overlap the first weld bead, a larger amount of heat is applied to the same spot, and strength of the spot can be degraded.

The disclosure provides an exhaust manifold in which strength degradation is restrained, and a method of manufacturing the exhaust manifold.

An aspect of the disclosure relates to an exhaust manifold including: a body portion having a plurality of branch pipes in which base end portions of the branch pipes are joined together, and distal end portions of the branch pipes branch from each other; and a flange portion having a plurality of openings to which the distal end portions of the branch pipes are inserted, respectively, wherein: the body portion includes a first split body having a plurality of first semi-cylindrical portion, and a second split body having a plurality of second semi-cylindrical portions; the first semi-cylindrical portions of the first split body and the second semi-cylindrical portions of the second split body overlie each other, respectively, and define the branch pipes; the exhaust manifold includes a first weld bead and a plurality of second weld beads, the first weld bead welding the first semi-cylindrical portion and the second semi-cylindrical portion to each other from an outer surface side, the first semi-cylindrical portion and the second semi-cylindrical portion defining one of the branch pipes, the second weld beads welding an outer peripheral portion of the one of the branch pipes to an edge portion of the opening; at least one of the second weld beads partially overlaps the first weld bead; and end portions of neighboring second weld beads overlap each other and are separated from the first weld bead.

In the manifold according to the aspect, the end portions of the second weld beads that overlap each other are separated from the first weld bead. Therefore, application of a large amount of heat to the same spot is restrained. Thus, with the manifold according to the aspect, deterioration of strength is restrained.

In the above aspect, a first end and a second end of at least one of the second weld beads may be at symmetrical positions with respect to a prescribed line in a view from an axis of the distal end portion of the one of the branch pipes, the prescribed line being orthogonal to a direction in which the branch pipes are arranged in line.

In the manifold according to the aspect, the first end and the second end of at least one of the second weld beads are at symmetrical positions with respect to the straight line that is orthogonal to the direction in which the branch pipes are arranged in line. Therefore, a movement of a welding torch from the first end to the second end of the second weld bead is symmetrical with respect to the straight line. Thus, with the exhaust manifold according to the above aspect, it is easy to control, for example, an actuator that drives the welding torch. Further, for example, since the welding torch is operated easily, it is possible to drive the actuator more smoothly. This means that scanning performance of the welding torch from the first end to the second end of the second weld bead is improved.

Another aspect of the disclosure relates to a method of manufacturing an exhaust manifold, the method including: welding a first split body having a plurality of first semi-cylindrical portions, and a second split body having a plurality of second semi-cylindrical portions to each other by a first weld bead such that the first semi-cylindrical portions of the first split body and the second semi-cylindrical portions of the second split body overlie each other, respectively, and define a plurality of branch pipes in which base end portions of the branch pipes are joined together and distal end portions of the branch pipes branch from each other; and inserting the distal end portions of the branch pipes into a plurality of openings of a flange portion, respectively, and welding outer peripheral portions of the branch pipes and edge portions of the openings to each other, respectively, by a plurality of second weld beads, wherein: at least one of the second weld beads partially overlaps the first weld bead; and end portions of neighboring second weld beads overlap each other and are separated from the first weld bead.

In the method of manufacturing the exhaust manifold according to the above aspect, welding is carried out so that the end portions of the second weld beads that overlap each other are separated from the first weld bead. Therefore, application of a large amount of heat to the same spot is restrained. Thus, with the method of manufacturing the exhaust manifold according to the above aspect, degradation of strength of the manufactured manifold is restrained.

According to the disclosure, an exhaust manifold in which degradation of strength is restrained, and a method of manufacturing the exhaust manifold are provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
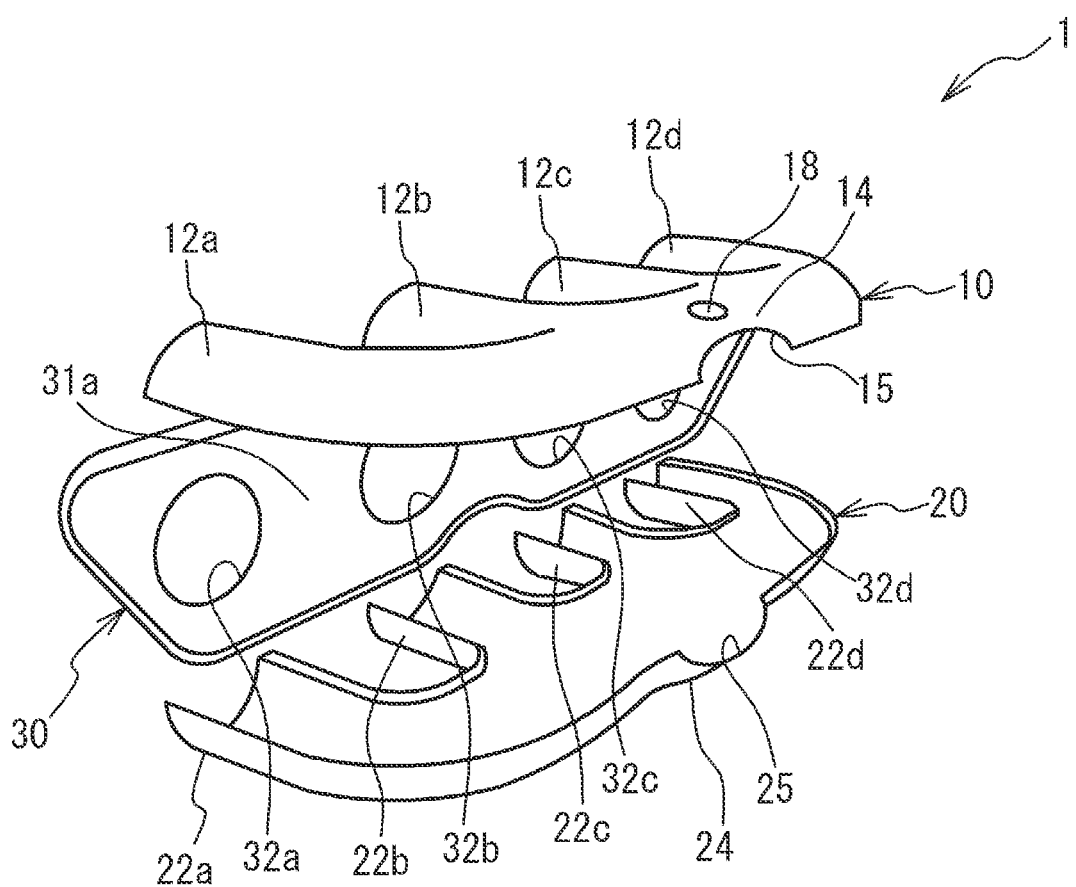
FIG. 1 is an exploded perspective view of an exhaust manifold.
Figure 2:
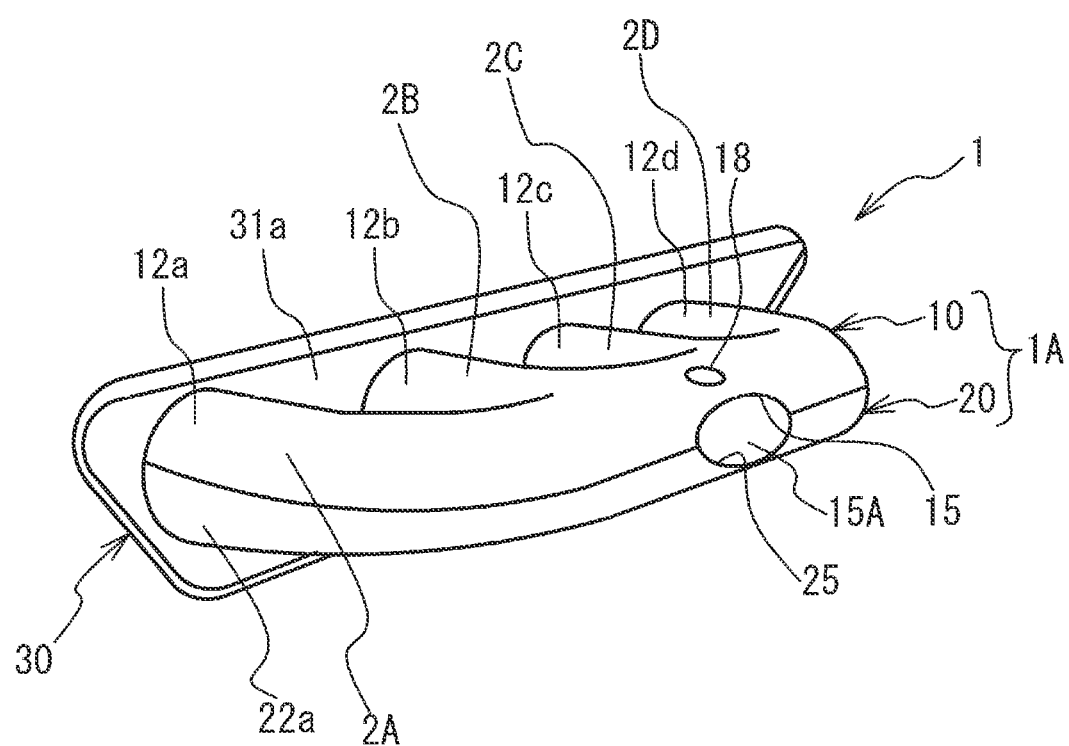
FIG. 2 is a perspective view of the exhaust manifold that is completed.

FIG. 1 is an exploded perspective view of an exhaust manifold 1. FIG. 2 is a perspective view of the exhaust manifold 1 that is completed. The exhaust manifold 1 includes a body portion 1A and a flange portion 30. The body portion 1A is made of split bodies 10, 20. The split bodies 10, 20 and the flange portion 30 are pressed metallic members that are joined to each other so as to complete the exhaust manifold 1. The split body 10 includes semi-cylindrical portions 12a, 12b, 12c, 12d. The shape of each of the semi-cylindrical portions 12a, 12b, 12c, 12d is a shape of one of split parts of a cylinder, the split parts being made by dividing the cylinder along a plane that passes the axis of the cylinder. Base end portions of the semi-cylindrical portions 12a, 12b, 12c, 12d join together, and distal end portions of the semi-cylindrical portions 12a, 12b, 12c, 12d branch from each other. In a joining portion 14 where the semi-cylindrical portions 12a, 12b, 12c, 12d join together, a semicircular cutout 15 is formed. Similarly, the split body 20 includes semi-cylindrical portions 22a, 22b, 22c, 22d. Base end portions of the semi-cylindrical portions 22a, 22b, 22c, 22d join together, and distal end portions of the semi-cylindrical portions 22a, 22b, 22c, 22d branch from each other. In a joining portion 24 where the semi-cylindrical portions 22a, 22b, 22c, 22d join together, a semicircular cutout 25 is formed. In the joining portion 14, a mounting hole 18 for mounting an air-fuel ratio sensor is formed.

The split bodies 10, 20 are welded to each other by arc welding so that the semi-cylindrical portions 12a, 12b, 12c, 12d overlie the semi-cylindrical portions 22a, 22b, 22c, 22d, respectively. As the semi-cylindrical portions 12a, 22a overlie each other, a branch pipe 2A is defined. Similarly, the semi-cylindrical portions 12b, 22b define a branch pipe 2B, the semi-cylindrical portions 12c, 22c define a branch pipe 2C, and the semi-cylindrical portions 12d, 22d define a branch pipe 2D. Therefore, the base end portions of the branch pipes 2A, 2B, 2C, 2D join together, and the distal end portions of the branch pipes 2A, 2B, 2C, 2D branch from each other. Further, as the cutouts 15, 25 overlie each other, a communication hole 15A is defined. A catalytic converter or the like is connected with the communication hole 15A.

Figure 3:
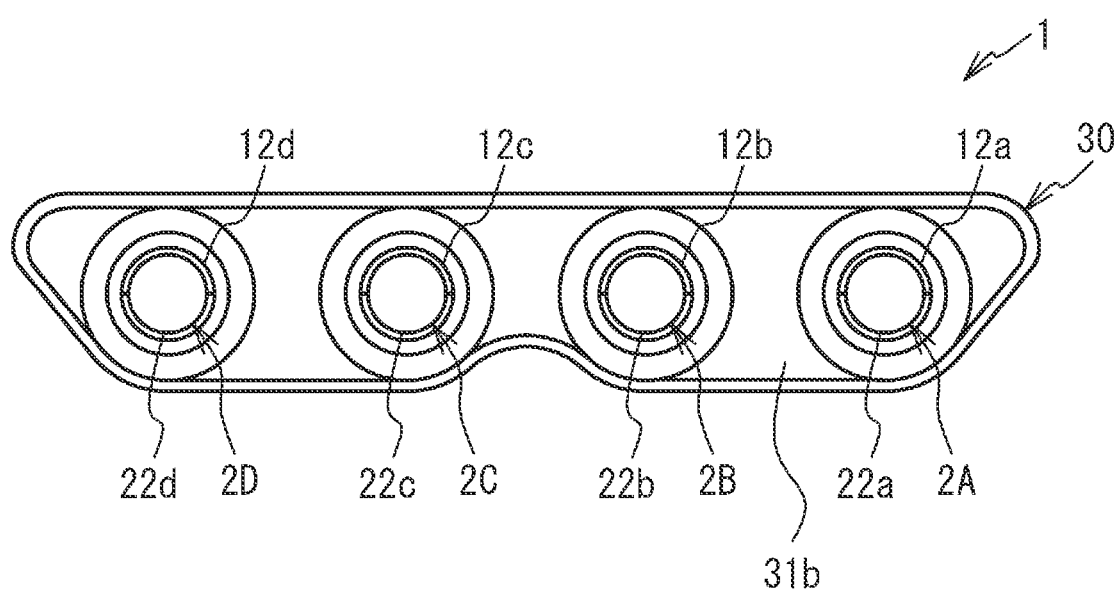
FIG. 3 is a view of a flange portion of the completed exhaust manifold seen from a back surface side.

The flange portion 30 has an almost flat plate shape and includes four openings 32a, 32b, 32c, 32d that are provided in line in a longitudinal direction of the flange portion 30. In a state where the distal end portions of the branch pipes 2A, 2B, 2C, 2D are inserted in the openings 32a, 32b, 32c, 32d, respectively, from a side of a front surface 31a of the flange portion 30, the flange portion 30 and the distal end portions of the branch pipes 2A, 2B, 2C, 2D are welded to each other by arc welding, respectively. FIG. 3 is a view of the flange portion 30 of the completed exhaust manifold 1, seen from a side of a back surface 31b of the flange portion 30. The back surface 31b is on the opposite side of the flange portion 30 with respect to the front surface 31a. The distal end portions of the branch pipes 2A, 28, 2C, 2D are inserted into the openings 32a, 32b, 32c, 32d, respectively, so as not to protrude out of the back surface 31b, and welded to peripheries of the openings 32a, 32b, 32c, 32d, respectively. The back surface 31b of the flange portion 30 is a surface located on a side to be attached to an engine.

As described so far, the split bodies 10, 20 are formed individually and then welded to each other. Thus, the body portion 1A is manufactured. This kind of manufacturing method is often used for manufacturing the small-sized exhaust manifold 1 efficiently.

Figure 4:
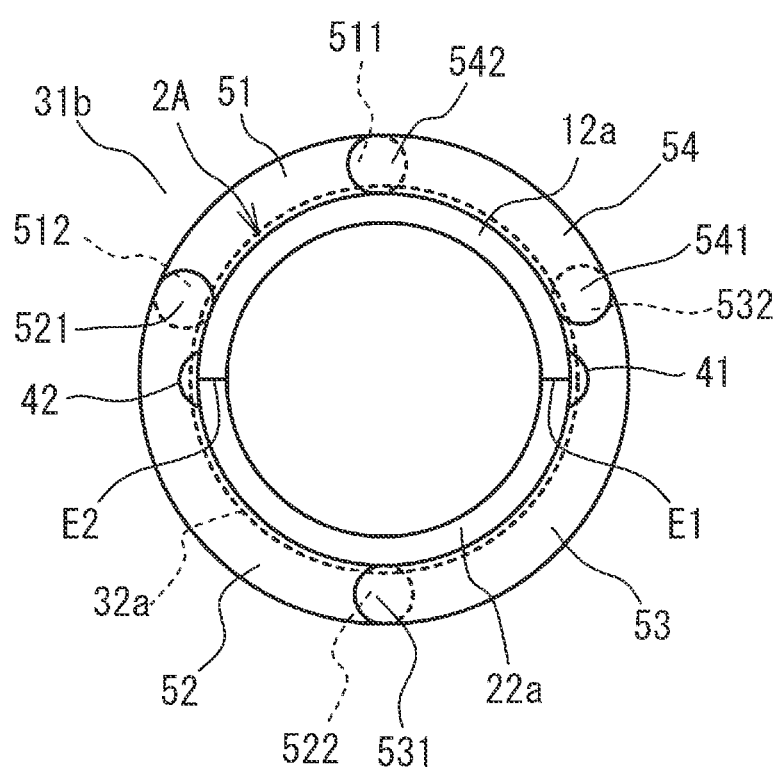
FIG. 4 is a view describing welding of an outer peripheral portion of a branch pipe and an edge portion of an opening.

FIG. 4 is a view describing welding of an outer peripheral portion of the branch pipe 2A and an edge portion of the opening 32a. The semi-cylindrical portions 12a, 22a, which define the branch pipe 2A, contact with each other at mating surfaces E1, E2. On outer sides of the mating surfaces E1, E2, weld beads 41, 42 are formed, respectively, so as to weld the semi-cylindrical portions 12a, 22a to each other. The weld beads are formed as a part of a weld metal melted by a laser beam, solidifies on a member to be welded and then is raised in a belt shape. The weld beads 41, 42 represent marks of welding of the semi-cylindrical portions 12a, 22a. The weld beads 41, 42 extend on the outer surface of the branch pipe 2A in the axis direction along the mating surfaces E1, E2, respectively, and have shapes that bulge from the outer surface of the branch pipe 2A.

The weld beads 51, 52, 53, 54 are formed continuously in the outer peripheral portion of the branch pipe 2A and the edge portion of the opening 32a in the circumferential direction. The weld beads 51, 52, 53, 54 weld the outer peripheral portion of the distal end portion of the branch pipe 2A, and the edge portion of the opening 32a on the back surface 31b side of the flange portion 30. Each of the weld beads 51, 52, 53, 54 is formed into an arc shape.

The weld bead 51 has a first end 511 and a second end 512. Similarly, the weld bead 52 has a first end 521 and a second end 522, the weld bead 53 has a first end 531 and a second end 532, and the weld bead 54 has a first end 541 and a second end 542. In the weld beads 51, 52 that are next to each other, the first end 521 overlies the second end 512. Similarly, the first end 531 overlies the second end 522, the first end 541 overlies the second end 532, and the second end 542 overlies the first end 511. Thus, the end portions of the neighboring weld beads overlap each other, and all of the weld beads 51, 52, 53, 54 weld the outer peripheral portion of the branch pipe 2A and the edge portion of the opening 32a without any clearance. The first end and the second end that overlap each other as described above are heated twice.

In each of the weld beads, portions where the first end and the second end overlap each other are raised more than an intermediate portion between the first end and the second end. Further, in the example in FIG. 4, the way the first end and the second end overlap each other as described above shows that the weld beads 51, 52, 53, 54 are welded in this order. However, the welding order is not limited to this. The first end and the second end that overlap each other described above are only an example of the end portions that overlap each other. In the embodiment, the first end is a starting end that shows a starting position of welding, and the second end is a finishing end that shows a finishing position of welding. However, the embodiment is not limited to this.

In the example, the weld bead 41 partially overlaps the weld bead 53. However, the second end 532 and the first end 541 that are the closest to the weld bead 41 do not overlap the weld bead 41 and are separated from the weld bead 41. Similarly, the weld bead 42 partially overlaps the weld bead 52. However, the second end 512 and the first end 521 that are the closest to the weld bead 42 do not overlap the weld bead 42 and are separated from the weld bead 42. If the weld bead 41 overlaps the second end 532 and the first end 541, the same spot would be heated three times. It is the same for a case where the weld bead 42 overlaps the second end 512 and the first end 521. When a large amount of heat is applied to the same spot as described above, a heat input to the spot becomes excessive, and strength can be deteriorated. In the example, as described above, the second end 532 and the first end 541 are separated from the weld bead 41, and the second end 512 and the first end 521 are also separated from the weld bead 42. Therefore, the number of times that heat is applied to the same spot is suppressed, thus restraining degradation of strength of the exhaust manifold 1.

The four weld beads 51, 52, 53, 54 are described in the example. However, the number of the weld beads may be at least two as long as the weld beads are formed in the entire circumference in the outer peripheral portion of the branch pipe 2A and the edge portion of the opening 32a without any clearance.

Figure 5:
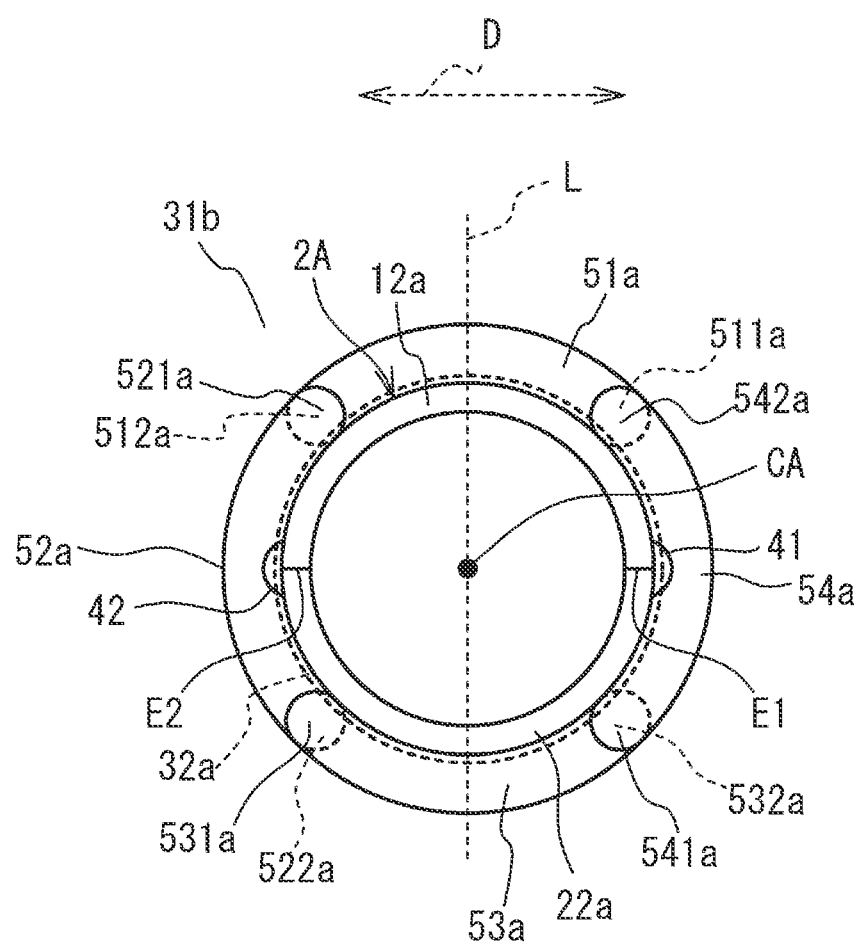
FIG. 5 is a view describing welding according to a modification.

Next, a modification of welding of the outer peripheral portion of the branch pipe 2A and the edge portion of the opening 32a is described. FIG. 5 is a view describing the modification of welding of the branch pipe 2A and the opening 32a of the flange portion 30. FIG. 5 corresponds to FIG. 4. In the modification, similar reference numerals are used for similar components so as to omit duplicated description. Weld beads 51a, 52a, 53a, 54a are formed such that each of the weld beads 51a, 52a, 53a, 54a occupies a range of an equal angle which is almost 90 degrees.

As shown in FIG. 5, in a view from a center axis CA of the distal end portion of the branch pipe 2A, a first end 511a and a second end 512a of the weld bead 51a are at symmetrical positions with respect to a line L that is orthogonal to the direction D in which the branch pipes 2A, 2B, 2C, 2D are arranged in line. Therefore, it is possible to move a welding torch from the first end 511a to the second end 512a of the weld bead 51a symmetrically with respect to the line L. Therefore, according to the modification, it is easy to control, for example, an actuator that drives the welding torch. Further, for example, because the welding torch is operated easily, it is possible to drive the actuator more smoothly. This means that scanning performance of a laser from the first end 511a to the second end 512a is improved. Similarly, a first end 531a and a second end 532a of the weld bead 53a are also at symmetrical positions with respect to the line L. Therefore, scanning performance of a laser from the first end 531a to the second end 532a is improved.

In the modification, the weld beads 52a, 54a also partially overlap the weld beads 42, 41, respectively. However, all of the first ends 511a, 521a, 531a, 541a and the second ends 512a, 522a, 532a, 542a are separated from the weld beads 41, 42. Therefore, in the modification, degradation of strength of an exhaust manifold is also restrained.

The embodiment and modification of the disclosure has been described in detail. However, the disclosure is not limited to the specific embodiment or modification, and various modifications and changes may be made without departing from the gist of the disclosure stated in the claims.

In the embodiment, the exhaust manifold 1 includes the four branch pipes 2A, 2B, 2C, 2D and the four openings 32a, 32b, 32c, 32d that correspond to the four branch pipes 2A, 2B, 2C, 2D, respectively. However, the embodiment is not limited to this, and the exhaust manifold only needs at least two branch pipes and at least two openings that correspond to the branch pipes, respectively.

What is claimed is:

1. An exhaust manifold comprising:
   a body portion having a plurality of branch pipes in which base end portions of the branch pipes are joined together, and distal end portions of the branch pipes branch from each other; and
   a flange portion having a plurality of openings to which the distal end portions of the branch pipes are inserted, respectively, wherein:
   the body portion includes a first split body having a plurality of first semi-cylindrical portions, and a second split body having a plurality of second semi-cylindrical portions;
   the first semi-cylindrical portions of the first split body and the second semi-cylindrical portions of the second split body overlie each other, respectively, and define the branch pipes;
   the exhaust manifold includes a first weld bead and a plurality of second weld beads, the first weld bead welding the first semi-cylindrical portion and the second semi-cylindrical portion to each other from an outer surface side, the first semi-cylindrical portion and the second semi-cylindrical portion defining one of the branch pipes, the second weld beads welding an outer peripheral portion of the one of the branch pipes to an edge portion of the opening;
   at least a first one of the second weld beads partially overlaps the first weld bead;
   end portions of neighboring second weld beads overlap each other and are separated from the first weld bead; and
   a first end and a second end of at least a second one of the second weld beads are at symmetrical positions with respect to a prescribed line in a view from an axis of the distal end portion of the one of the branch pipes, the prescribed line being orthogonal to a direction in which the branch pipes are arranged in line.

2. A method of manufacturing an exhaust manifold, the method comprising:
   welding a first split body having a plurality of first semi-cylindrical portions, and a second split body having a plurality of second semi-cylindrical portions to each other by a first weld bead such that the first semi-cylindrical portions of the first split body and the second semi-cylindrical portions of the second split body overlie each other, respectively, and define a plurality of branch pipes in which base end portions of the branch pipes are joined together and distal end portions of the branch pipes branch from each other; and inserting the distal end portions of the branch pipes into a plurality of openings of a flange portion, respectively, and welding outer peripheral portions of the branch pipes and edge portions of the openings to each other, respectively, by a plurality of second weld beads, wherein:

at least a first one of the second weld beads partially overlaps the first weld bead;

end portions of neighboring second weld beads overlap each other and are separated from the first weld bead; and a first end and a second end of at least a second one of the second weld beads are at symmetrical positions with respect to a prescribed line in a view from an axis of the distal end portion of one of the branch pipes, the prescribed line being orthogonal to a direction in which the branch pipes are arranged in line.

\* \* \* \* \*